United States Patent
Lucas et al.

(10) Patent No.: US 7,122,593 B2
(45) Date of Patent: Oct. 17, 2006

(54) MAGNETICALLY DETECTABLE LATEX ARTICLES

(75) Inventors: David M. Lucas, Petaling Jaya (MY); James Barclay, Jr., Marietta, GA (US); Liong Yu Loo, Ipoh (MY); Hee Meng Lai, Melaka (MY); Siau Woon Wong, Kulim (MY)

(73) Assignee: Ansell Healthcare Products LLC, Red Bank, NJ (US)

( * ) Notice: Subject to any disclaimer, the term of this patent is extended or adjusted under 35 U.S.C. 154(b) by 0 days.

(21) Appl. No.: 10/500,235

(22) PCT Filed: Jan. 14, 2003

(86) PCT No.: PCT/US03/01098

§ 371 (c)(1),
(2), (4) Date: Dec. 22, 2004

(87) PCT Pub. No.: WO03/076476

PCT Pub. Date: Sep. 18, 2003

(65) Prior Publication Data

US 2005/0119387 A1 Jun. 2, 2005

Related U.S. Application Data

(60) Provisional application No. 60/348,960, filed on Jan. 14, 2002.

(51) Int. Cl.
*C08K 3/08* (2006.01)
(52) U.S. Cl. ..................... 524/407; 524/431
(58) Field of Classification Search ............ 524/407, 524/431
See application file for complete search history.

(56) References Cited

U.S. PATENT DOCUMENTS

| | | |
|---|---|---|
| 2,956,955 A | 10/1960 | Arthur |
| 3,676,273 A | 7/1972 | Graves |
| 4,024,318 A | 5/1977 | Forster et al. |
| 4,041,010 A | 8/1977 | Jeram |
| 4,521,549 A | 6/1985 | Penneck |
| 4,585,848 A | 4/1986 | Evans et al. |
| 4,599,374 A | 7/1986 | Blue Stein |
| 4,708,976 A | 11/1987 | Ryan |
| 4,798,856 A | 1/1989 | Ayala et al. |
| 5,019,453 A | 5/1991 | Guerra |
| 5,292,562 A | 3/1994 | Fitzgerald et al. |
| 5,467,481 A | 11/1995 | Srivastaua |
| 5,510,412 A | 4/1996 | Suzuki et al. |
| 5,648,013 A | 7/1997 | Uchida et al. |
| RE35,616 E | 9/1997 | Tillotson et al. |
| 5,753,361 A | 5/1998 | Visser |
| 5,766,812 A | 6/1998 | Malhotra |
| 5,843,329 A | 12/1998 | Deetz |
| 5,922,482 A | 7/1999 | De Ricci et al. |
| 5,990,218 A | 11/1999 | Hill et al. |
| 6,120,531 A | 9/2000 | Zhou et al. |

FOREIGN PATENT DOCUMENTS

| | | |
|---|---|---|
| EP | 0456333 A1 | 11/1991 |
| GB | 1072515 | 6/1967 |
| GB | 1470502 | 4/1977 |
| GB | 2372934 | 11/2002 |
| WO | WO 97/48765 A1 | 12/1997 |
| WO | WO 02/071876 | 9/2002 |

OTHER PUBLICATIONS

Rouques, "Flexible Magnetic Materials," *Engineers' Digest*, 27(2), 101-103 (1966).

"Magnetic Susceptibility of the Elements and Inorganic Compounds," *CRC Handbook of Chemistry and Physics*, 80th Ed., David R. Lide, Ed., pp. 4-131 to 4-136, Boca Raton: CRC Press (1999).

*Primary Examiner*—Edward J. Cain
(74) *Attorney, Agent, or Firm*—Glen M. Diehl; Karen M. Whitney; Diehl Servilla LLC

(57) ABSTRACT

A latex article is provided that contains chromium oxide particles dispersed throughout a cured latex layer. The chromium oxide particles render the latex article, or smaller pieces of the latex article, magnetically detectable. The chromium oxide may be present within the latex in combination with magnetically detectable ferrite. The article may include multiple cured latex layers having chromium oxide or magnetically detectable ferrite dispersed throughout the cured latex layers.

21 Claims, No Drawings

MAGNETICALLY DETECTABLE LATEX ARTICLES

This application is the National Stage of International Application No. PCT/US03/01098, filed Jan. 14, 2003, which claims the benefit of U.S. Provisional Application No. 60/348,960, filed Jan. 14, 2002.

FIELD OF THE INVENTION

The invention relates to latex materials such as gloves or other latex articles that contain magnetic materials that may be detected by a metal detector.

BACKGROUND OF THE INVENTION

Manufacturing or packaging line employees in the prepared-foods, agri-food stuffs, and pharmaceuticals industries are generally required to wear sealed gloves for hygiene purposes. The gloves used for these purposes are usually white or of a light flesh color. During the course of manufacturing or packaging, small pieces of the glove may become torn off or separated from the glove. The small pieces of glove may become contaminants in the food or pharmaceutical product being handled. The white or light flesh-colored glove pieces are often difficult to discern from the product and, therefore, become very difficult to remove prior to packaging and shipping the product.

Detecting glove pieces may be solved by use of gloves of a color that distinctively contrasts the color of the product. However, reliance upon visual detection alone leaves room for human error and missed contaminants may be packaged with the product.

Flexible polymers or magnets containing an amount of magnetically detectable ferrite have been known since the 1960s. A glove containing ferrite for purposes of rendering the glove magnetically detectable has been described. The polymeric materials that have ferrite added as fillers will be either dark red or black in color depending upon the oxidation state of the iron in the ferrite. The use of red or black colored gloves for use in the preparation of food or pharmaceutical products may be objectionable in some applications.

Chrome oxides are known for their magnetic properties. Specifically, chromium (IV) oxide, or $CrO_2$, and chromium (III) oxide, or $Cr_2O_3$, possess magnetic properties. Chromium (III) oxide has a molar susceptibility of +1960, which is calculated based on the magnetic field, the magnetization (magnetic moment per unit volume), the molar volume of the substance, the molar mass, and the mass density. CRC *Handbook of Chemistry & Physics*, David R. Lide, Magnetic Susceptibility of the Elements and Inorganic Compounds, p. 4–132. Chromium (VI) oxide has magnetic properties, but to a much lesser degree, with a molar susceptibility of +40. Id. Chromium (IV) oxide is more magnetic than chromium (VI) oxide and is commonly used in magnetic media, in which needle-shaped particles of $CrO_2$ are used to create a magnetic surface for videotapes and audiotapes. The use of chromium oxide compounds in polymeric films is known in the recording tape industry. Magnetic tapes containing $CrO_2$ have been widely used since the 1970s. Chromium oxide such as $CrO_2$ has also been used in films containing magnetically oriented pigment. Chromium oxide in the form of $Cr_2O_3$ is olive green in color. Chromium oxide in the form of $CrO_2$ is black in color.

U.S. Pat. No. 5,467,481 describes protective gloves that color the hands of the wearer for purposes of reminding the wearer to wash after removing the gloves. Chromium oxide in the form of $Cr_2O_3$ is used as a preferred colorant, but is not contained within polymer layers of the glove, rather the chromium oxide is a powder that coats the interior of the glove. The pigmented glove, however, was not used for its magnetic property.

U.S. Pat. No. 5,019,453 describes a protective material that includes a layer of vinylidene chloride, or a copolymer of vinylidene, between two layers of polyethylene to provide protection against permeation and breakthrough. One or more of the layers may be treated with a strong oxidant, and the oxidant may be chromium trioxide. However, the chromium trioxide is not incorporated and dispersed throughout the polymer and was only used to oxidize a layer in preparation for lamination.

Additionally, metal oxide-containing fibers, fabrics, clothes and shoes are known. The metal oxides are purported to have a therapeutic effect on the wearer of these items. For example, in U.S. Pat. No. 6,120,531 a metal oxide substance contained in the fibers, fabric or clothing may include substances containing up to 96% chromium oxide. However, chromium oxide was chosen for its reflective properties rather than for its magnetic properties. When stimulated by the body heat of the wearer, the metal oxide material in the fabric or clothing reflects the heat to an area required for a particular therapeutic purpose.

There is a need, therefore, for magnetically detectable latex articles such as gloves. There is also a need for latex articles such as gloves having magnetic properties such that pieces of the latex article or glove may be detected by a magnet.

SUMMARY OF THE INVENTION

Accordingly, the present invention provides a latex article such as a glove comprising a latex layer, the latex layer comprising chromium oxide particles dispersed throughout the latex layer. The chromium oxide particles render the latex article, or smaller pieces of the latex article, magnetically detectable.

DETAILED DESCRIPTION OF THE INVENTION

There is provided according to one embodiment of the present invention a magnetically detectable glove. While the following description and examples describe the preparation of magnetically detectable gloves, it will be understood by those of ordinary skill in the art that the present invention may be applied to the manufacture of other magnetically detectable latex articles such as finger cots and finger cones. The glove may be made from nitrile, natural rubber, polyurethane and polychloroprene latex formulations containing chromium oxide, or a combination of chromium oxide and ferrite, particularly magnetite. As used herein, the term chromium oxide refers to chromium oxide in the forms $Cr_2O_3$, $CrO_2$, or a combination thereof, unless stated otherwise. The gloves of the present invention, and pieces thereof, are magnetically detectable.

The glove of the present invention can be made using conventional latex dipping technology. The glove can be manufactured by dipping ceramic or aluminum glove formers shaped like hands into tanks of liquid latex and admixed chemicals. The former can be precoated with a coagulant to gel the latex and to facilitate the subsequent removal of the glove from the former. The precoated former is then dipped in the tanks of chemicals necessary to make the glove. The "wet" glove is dried and cured in a heated oven and the latex glove cures on the mold. The outside layer of the dipped former will ultimately be the inside of the glove.

While still on the former, the latex glove also goes through one or more rinses to leach out proteins and residual chemicals before it is stripped off the mold, packaged, and sterilized.

The latex used to make the glove of the present invention can contain vulcanization agents that cure natural rubber and produce a dry rubber film. Thus, the film surface of the cured latex may be "tacky" after the glove is dried, particularly where a natural rubber latex is used to make the glove. It is therefore conventional to incorporate detackifying agents in the manufacturing process to facilitate the release of a glove from its glove former.

The glove may be produced in a mass production line where a plurality of gloves are sequentially, rapidly and consistently produced. Such a technique conveys and manipulates multiple glove formers through a series of chemical solutions that make the glove. The formers are made of porcelain, steel or plastic. According to the standard manufacturing process, gloves may be produced directly on the formers that are conveyed from one station to the next. For example, the formers are dipped into surfactants, waxes, coagulants and natural or synthetic resins to obtain a layer of the desired characteristics. The formers can also be overdipped with a silicone emulsion. The technique allows for altering the composition, the order of application, and the method of application of ingredients that make up the layer of the glove. In addition, specific characteristics of the material, such as breathability, moisture absorbency, thickness, tensile strength, penetration resistance, stretch characteristics, flexibility and density of the finished product, may be controlled.

The glove may be built up from multiple dips into various substances. For example, the former may be initially dipped into a composition of a powder free release agent and a coagulant. That release agent and coagulant dip supplies a release material for the subsequent removal of the finished glove from the former. In addition, the coagulant material will destabilize subsequent liquid resin materials such as elastomers.

Alternatively the former may be first treated with a powder-free release agent and then with a coagulant. Separate applications of the powder-free release agent and coagulant may, however, necessitate a long drying period between and after their application. Such long drying times can be costly as modifications to a continuous dipping line are required. The two-step method of treating the formers also requires greater temperatures than that of the one step process. As a result, more complicated parameter control is required and cost is increased. But, the mixture of coagulant and release agent for use in a single dipping step does not exhibit the degree of instability that would normally be expected due to the differing chemical characteristics of the constituents used in compounding the powder-free coagulant. Thus, there is a trade-off to be considered between a single application of a mixture of coagulant and release agent and a two-step process separately applying the release agent and coagulant.

After the release agent/coagulant dip is applied, the former is preferably conveyed to the next station in the production line where the laminate layer is applied to the former. The laminate layer may be comprised of an elastomeric or liquid resin dip, such as natural rubber latex. Alternatively, the laminate layer may be a natural or synthetic rubber, such as synthetic latex, polyurethane, nitrile or polychloroprene. By varying the content of the latex material, the laminate layer may be varied to provide different degrees of strength, comfort and flexibility. In any event, the content of the latex applied to the former will preferably be adjusted to provide the desired gripability, protection from cuts and abrasions and liquid repellency. If desired, the gelled latex film can be overdipped with copolymers of vinyl methyl ether and maleic esters.

After the application of the laminate layer, a second coagulant dip may be applied if another laminate layer is to be applied. The second coagulant dip, which is preferably in the form of a tackifying agent, provides a medium for adherence of the laminate applied in the next step. According to an alternative technique, the former may be immersed into an adhesive dip to provide strength and a tacky surface for the application of the next laminate layer. Such an adhesive dip may be comprised of any synthetic resin material, and preferably an elastomer. Different degrees of strength and flexibility may be obtained by varying the characteristics of the adhesive material. After application of either a second coagulant dip or an adhesive dip, the former is conveyed to the next station where the next laminate layer is applied.

After application of one or more laminate layers, the former is preferably passed through ovens at elevated temperatures to dry and cure and provide the final product. The glove is then removed either manually or by an automated technique.

According to the substantially automated mass production technique described above, a great number of variations may be introduced to provide additional or different desired characteristics of the laminate in accordance with the present invention.

In embodiments of the present invention, various latex formulations were prepared to contain a chromium oxide concentration of 10 parts per hundred parts of the total latex by weight. The units for the components of the following formulations were based on the latex content being set to 100 parts and all other components are then set to parts per hundred of rubber ("phr"). Chromium oxide may be used in concentrations of about 1 phr to about 50 phr. The chromium oxide is added and mixed into the latex to form a nearly uniform dispersion of chromium oxide. Some settling may occur. However, it is preferred that the chromium oxide be uniformly dispersed in the latex so that the chromium oxide is uniformly distributed in the latex layer of the glove.

In another embodiment of the present invention, various latex formulations were prepared to contain a chromium oxide concentration of 5 parts per hundred parts and a ferrite concentration of 5 parts per hundred parts of the total latex by weight. A preferred ferrite is magnetite. As described above, the units for the components of the following formulations were based on the latex content being set to 100 parts and all other components are then set to parts per hundred of rubber ("phr"). Chromium oxide may be used in concentrations of about 1 phr to about 50 phr. Ferrite, generally, may be used in concentrations of about 1 phr to about 50 phr. The chromium oxide is added and mixed into the latex to form a nearly uniform dispersion of chromium oxide. Similarly, the ferrite is added and mixed into the latex to form a nearly uniform dispersion of chromium oxide and ferrite. Some settling may occur. However, it is preferred that the chromium oxide and ferrite be uniformly dispersed in the latex so that the chromium oxide and ferrite are uniformly distributed in the latex layer of the glove.

The following formulations are described as examples of embodiments of the present invention.

Formulation A
Nitrile formulation with chromium oxide

| | |
|---|---|
| 68074 Nitrile Latex | 100 |
| AQUAMIX 132 | 1.74 |
| AQUAMIX Sulfur | 0.68 |
| MBT | 0.25 |
| Butyl Zimate | 0.5 |
| WINGSTAY L | 0.12 |
| Potassium hydroxide (10%) | 0.5 |
| FERRISPEC PL $Cr_2O_3$ | 10 |

Formulation B
Nitrile formulation with chromium oxide and magnetite

| | |
|---|---|
| 68074 Nitrile Latex | 100 |
| AQUAMIX 132 | 1.74 |
| AQUAMIX Sulfur | 0.68 |
| MBT | 0.25 |
| Butyl Zimate | 0.5 |
| WINGSTAY L | 0.12 |
| Potassium hydroxide (10%) | 0.5 |
| FERRISPEC PL $Cr_2O_3$ | 5 |
| FERRISPEC PL Magnetite | 5 |

Formulation C
Natural rubber formulation with chromium oxide

| | |
|---|---|
| Prevulcanized Natural Rubber | 100 |
| FERRISPEC PL $Cr_2O_3$ | 10 |

The chromium oxide used in the examples provided herein may be obtained from Elementis Pigments, Fairview Heights, Ill. Other sources of chromium oxide may be used. Magnetite used in the examples provided herein may also be obtained from Elementis Pigments or any other source of magnetite. The particle size of the $Cr_2O_3$ used in the preparation of the gloves of the examples provided herein ranges in size from 0.30 μm–15.00 μm.

Both the FERRISPEC chromium oxide and magnetite dispersion were introduced into the latex formulations without any signs of instability and all the formulations proved to be stable on storage. Gloves of the various formulations were prepared using standard bisque solvex formers, know to those of skill in the art of making latex gloves, according to the parameters in Table 1.

The nitrile latex and prevulcanized natural rubber used in the above examples may be obtained from any of various sources known to those of skill in the art of making latex gloves. AQUAMIX 132 and AQUAMIX Sulfur may be obtained from Poly One Corporation, Massillon, Ohio. WINGSTAYL may be obtained from Eliokem, Inc., Akron, Ohio.

TABLE 1
Glove Preparation Parameters

| | |
|---|---|
| Coagulant | TNT Nitrile (30% calcium nitrate) |
| Coagulant temperature, ° F. | 140 |
| Drying oven temperature, ° F. | 285 |
| Drying oven time | 30 seconds |
| Residence time in latex, sec. | Various to achieve thickness |
| Leach bath temperature, ° F. | 110–120 |
| Leach bath time | 30 minutes |
| Pre-bead oven temperature, ° F. | 250 |
| Pre-bead time | 60 seconds |
| Cure oven temperature, ° F. | 250 |
| Cure oven time | 60 minutes |
| Post leach temperature, ° F. | 150–160 |
| Post leach time | 24 seconds |
| Chlorination bath conc. (ppm chlorine) | 800–1000 |
| Chlorination bath time | 30 seconds |
| Final leach temperature, ° F. | 150–160 |
| Final leach time | 10 seconds |

The dwell times were varied among the formulations to result in a glove of a thickness of about 9 mils (225 microns) in a single wall. The gloves were post-chlorinated with an acidified hypochlorite solution with a total chlorine concentration of 1000 ppm chlorine for 1 minute to remove the powder from the coagulant. The gloves were then dried in a plant drier, known to persons of ordinary skill in the art of making latex gloves, on a low setting. The gloves were neutralized with sodium hydroxide solution and rinsed with water prior to drying. The gloves containing chromium oxide were olive green in color, whereas the gloves containing chromium oxide and magnetite were almost black in appearance. All the gloves prepared showed good initial physical properties.

Metal detection testing was conducted on 1 square centimeter pieces of each glove prepared using the formulations described above. A Safeline, in-process, metal detector set to run at 90 feet per minute and targeted to detect metal fragments as small as 0.8 millimeters in diameter detected 10 mm by 10 mm glove fragments prepared from all three formulations. The Safeline metal detector may be obtained from Safeline Incorporated, Tampa, Fla.

As the sensitivity of metal detection increases, it is understood that the concentrations and proportions of magnetic materials in the gloves may decrease.

In an alternative embodiment, the latex articles of the present invention may be made having multiple-laminate layers. For example, a latex dispersion comprising chromium oxide and a latex dispersion comprising magnetite may each be made according to the principles of the present invention. A glove former may be dipped in each dispersion in a process for making multiple-laminate layers as described above, making, for example, a latex article having a layer of cured latex having chromium oxide dispersed throughout the cured latex layer next to a layer of cured latex having magnetite dispersed throughout the cured latex layer. In yet another embodiment, a latex article having multiple-laminate layers may be made wherein a cured latex layer comprising magnetite is sandwiched between two layers of cured latex each comprising chromium oxide. Additional layers of cured latex, with or without chromium oxide or magnetite dispersions, may be added to any of the above embodiments.

As an example of a multiple-laminate layer latex article made according to the principles of the present invention, a latex glove was prepared having three layers. An inner cured latex layer, that is the layer in contact with the skin when the glove is donned, contained 10 parts per hundred of chromium oxide ($Cr_2O_3$) based on the weight of the latex layer.

An outer cured latex layer, that is the layer exposed to the elements when the glove is donned, contained 10 parts per hundred of chromium oxide ($Cr_2O_3$) based on the weight of the latex layer. A middle cured latex layer, that is a layer sandwiched between the inner cured latex layer and the outer cured latex layer, contained 25 parts per hundred of magnetite based on the weight of the latex layer. The glove and pieces cut from the glove were detectable using a metal detector.

It should be understood that various changes and modifications to the embodiments described herein will be apparent to those skilled in the art. Such changes and modifications can be made without departing from the spirit and scope of the present invention and without demising the attendant advantages. It is, therefore, intended that such changes and modifications be covered by the appended claims.

What is claimed is:

1. A magnetically detectable latex article, comprising:
   a glove having a cured latex layer; and
   chromium oxide dispersed throughout the cured latex layer.

2. The latex article of claim 1, wherein the cured latex layer comprises a latex selected from the group consisting of nitrile, natural rubber, polyurethane, and polychloroprene latex.

3. The latex article of claim 1, wherein the chromium oxide is present in the cured latex layer in an amount that is from about 1 to about 50 parts per hundred parts of the total weight of the cured latex layer.

4. The latex article of claim 1, wherein the chromium oxide is $Cr_2O_3$.

5. The latex article of claim 1, wherein the chromium oxide is $CrO_2$.

6. The latex of claim 1, wherein the chromium oxide is a mixture of $Cr_2O_3$ and $CrO_2$.

7. A magnetically detectable latex article, comprising:
   a glove having a cured latex layer; and
   chromium oxide dispersed throughout the cured latex layer; and
   ferrite dispersed throughout the cured latex layer.

8. The latex article of claim 7, wherein the cured latex layer comprises a latex selected from the group consisting of nitrile, natural rubber, polyurethane, and polychloroprene latex.

9. The latex article of claim 7, wherein the chromium oxide and ferrite are present in the cured latex layer in a total amount that is about 1 part per hundred parts to about 50 parts per hundred parts of the total weight of the cured latex layer.

10. The latex article of claim 7, wherein the chromium oxide is $Cr_2O_3$.

11. The latex article of claim 7, wherein the chromium oxide is $CrO_2$.

12. The latex article of claim 7, wherein the chromium oxide is a mixture of $Cr_2O_3$ and $CrO_2$.

13. The latex article of claim 7, wherein the ferrite is magnetite.

14. A magnetically detectable latex article, comprising:
   an outer cured latex layer, the outer cured latex layer comprising chromium oxide dispersed throughout the outer cured latex layer;
   a middle cured latex layer, the middle cured latex layer comprising ferrite dispersed throughout the middle cured latex layer; and
   an inner cured latex layer, the inner cured latex layer comprising chromium oxide dispersed throughout the inner cured latex layer.

15. The latex article of claim 14, wherein the cured latex layers comprise a latex selected from the group consisting of nitrile, natural rubber, polyurethane, and polychloroprene latex.

16. The latex article of claim 14, wherein the chromium oxide is present in the outer cured latex layer in an amount that is from about 1 to about 50 parts per hundred parts of the total weight of the outer cured latex layer.

17. The latex article of claim 14, wherein the chromium oxide is $Cr_2O_3$.

18. The latex article of claim 14, wherein the chromium oxide is $CrO_2$.

19. The latex article of claim 14, wherein the chromium oxide is a mixture of $Cr_2O_3$ and $CrO_2$.

20. The latex article of claim 14, wherein the ferrite is magnetite.

21. The latex article of claim 14, wherein the latex article is a glove.

* * * * *

UNITED STATES PATENT AND TRADEMARK OFFICE
CERTIFICATE OF CORRECTION

| | | |
|---|---|---|
| PATENT NO. | : 7,122,593 B2 | Page 1 of 1 |
| APPLICATION NO. | : 10/500235 | |
| DATED | : October 17, 2006 | |
| INVENTOR(S) | : David M. Lucas et al. | |

It is certified that error appears in the above-identified patent and that said Letters Patent is hereby corrected as shown below:

Title Page, under References Cited, 5,467,481 A, cancel "Srivastaua" and insert -- Srivastava -- therefor;

Column 1, line 3, insert -- CROSS REFERENCE TO RELATED APPLICATIONS --;

Column 5, line 57, cancel "WINGSTAYL" and insert -- WINGSTAY L -- therefor.

Signed and Sealed this

Sixth Day of February, 2007

JON W. DUDAS
*Director of the United States Patent and Trademark Office*